United States Patent [19]

Sudhakar et al.

[11] Patent Number: 5,525,211

[45] Date of Patent: Jun. 11, 1996

[54] SELECTIVE HYDRODESULFURIZATION OF NAPHTHA USING SELECTIVELY POISONED HYDROPROCESSING CATALYST

[75] Inventors: Chakka Sudhakar, Wappingers Falls; Max R. Cesar, Newburgh; R. Anthony Heinrich, Wappingers Falls, all of N.Y.

[73] Assignee: Texaco Inc., White Plains, N.Y.

[21] Appl. No.: 317,617

[22] Filed: Oct. 6, 1994

[51] Int. Cl.$^6$ .............................. C10G 45/08; B01J 23/24
[52] U.S. Cl. .................. 208/217; 208/216 R; 208/230; 208/243; 208/244; 208/247; 502/314; 502/306; 502/312; 502/315; 502/317; 502/322; 502/323
[58] Field of Search ........................... 208/216 R, 216 PP, 208/217, 230, 243, 244, 246, 247; 502/306, 314, 312, 315, 317, 322, 323

[56] References Cited

U.S. PATENT DOCUMENTS

| 3,867,282 | 2/1975 | Fischer et al. | 208/216 |
| 5,340,466 | 8/1994 | Dai et al. | 208/216 PP |
| 5,358,633 | 10/1994 | Dai et al. | 208/216 R |

OTHER PUBLICATIONS

Aldrich, Catalog, Handbook of Fine Chemicals, pp. 367–369.

*Primary Examiner*—Asok Pal
*Assistant Examiner*—Bekir L. Yildirim
*Attorney, Agent, or Firm*—Kenneth R. Priem; Richard A. Morgan

[57] ABSTRACT

Naphtha is selectively hydrodesulfurized using selectively poisoned hydrotreating catalyst to remove sulfur while minimizing loss in octane level due to olefin saturation.

22 Claims, No Drawings

SELECTIVE HYDRODESULFURIZATION OF NAPHTHA USING SELECTIVELY POISONED HYDROPROCESSING CATALYST

BACKGROUND OF THE INVENTION

1. Field of the Invention

This invention relates to a process for removing sulfur from naphtha, a petroleum product used to make fuels like gasoline. Specifically, a selectively poisoned hydrotreating catalyst is used to hydrodesulfurize naphtha while simultaneously minimizing olefin loss.

2. Description of Related Information

It is well known that air pollution is a serious environmental problem. A major source of air pollution worldwide is the exhaust from hundreds of millions of motor vehicles due to fuel combustion. Laws and regulations have been enacted reflecting the need to reduce harmful motor vehicle emissions through more restrictive fuel standards. Fuels containing sulfur produce sulfur dioxide and other pollutants leading to a host of environmental concerns, such as smog and related health issues, acid rain leading to deforestation, and water pollution, as well as other environmental problems. To help reduce or eliminate these environmental problems, the sulfur content of fuels has been, and will continue to be, restricted to increasingly smaller concentrations, such as less than 1 00 or even 50 parts per million (ppm).

The problem of sulfur in fuels is compounded in many areas where there are diminishing or no domestic sources of crude oil having relatively low sulfur content. For example, in the United States the supply of domestic oil production relies increasingly on lower grade crude oil with higher sulfur content. The need for lower sulfur content fuel therefore increases demand for imported oil having lower sulfur content, thereby increasing trade imbalance and vulnerability due to dependence on foreign sources of oil.

The sulfur content in crude oil can take the form of a wide variety of both aliphatic and aromatic sulfurous hydrocarbons. Various techniques have been developed for removing sulfur compounds. One such technique, called hydrodesulfurization (HDS), involves reacting hydrogen with the sulfur compounds in the presence of a catalyst. The general HDS reaction is illustrated in Equation 1.

$$RSR' + H_2 \rightarrow RH + R'H + H_2S$$

Equation 1: Hydrodesulfurization Reaction

In Equation 1, the sulfur compound, RSR', can be: a thiol or mercaptan, where R is hydrocarbyl and R' is hydrogen; a sulfide or disulfide, where the sulfur is connected to another sulfur atom in R or R' hydrocarbyl groups; or can be a thiophene where R and R' are connected to form a heterocyclic ring. The HDS reaction consumes hydrogen ($H_2$) and produces hydrogen sulfide ($H_2S$) and hydrocarbons wherein the sulfur atom is replaced by two hydrogen atoms. The hydrogen sulfide can then be separated to give a petroleum product in which the sulfur is significantly reduced or substantially eliminated.

HDS is one process within a class of processes called hydrotreating, or hydroprocessing, involving the introduction and reaction of hydrogen with various hydrocarbonaceous compounds. General hydrotreating reactions with oxygen compounds, nitrogen compounds and unsaturated hydrocarbons, including olefins, are illustrated in Equations 2, 3 and 4, respectively.

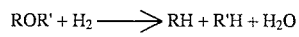

Equation 2: Hydrodeoxygenation Reaction

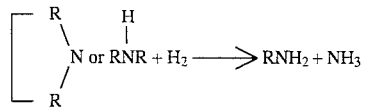

Equation 3: Hydrodenitrogenation Reaction

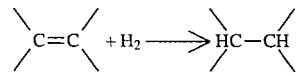

Equation 4: Hydrogenation Reaction

The hydrotreating reactions can occur simultaneously to various degrees when sulfur-, oxygen-, and nitrogen-containing and unsaturated compounds are present in the petroleum. The hydrotreating reactions are exothermic, producing heat. Such hydrotreatment has been used to remove not only sulfur, but to also remove nitrogen and other materials, like metals, not only for environmental considerations but also for other reasons, such as to protect catalysts used in subsequent processing from being poisoned by such elements. See, for example, *Applied Industrial Catalysis*, Volume I, edited by B. E. Leach, Academic Press (1983); *Chemistry of Catalytic Processes*, by B. C. Gates et al., McGraw-Hill (1979); and *Applied Heterogeneous Catalysis: Design Manufacture Use of Solid Catalysts*, by J. F. LePage et al., Technip, Paris (1987).

Olefins are useful in fuel feedstocks because they generally raise the octane number of the fuel, increasing its value and performance properties. For example, cracked naphtha typically contains over 20 weight percent olefins having octane numbers that are generally higher than the corresponding saturated hydrocarbons. However, HDS of naphtha using standard hydrotreating catalysts under conditions required for sulfur removal produces a significant loss of olefins through hydrogenation. This produces a lower grade fuel which then needs more refining, such as isomerization, blending, or other refining, to produce higher octane fuel, adding significantly to production expenses.

Selective HDS to remove sulfur while minimizing hydrogenation of olefins and octane reduction by various techniques, such as selective catalysts, has been described. For example, U.S. Pat. No. 4,132,632 (Yu et al.) and U.S. Pat. No. 4,140,626 (Bertolacini et al.) disclose selective desulfurization of cracked naphthas by using specific catalysts having particular amounts of Group VIB and VIII metals on magnesia support.

It would be desirable to have a process for removing sulfur from olefin containing fuel feedstocks, like naphtha, which minimizes loss of octane value using an inexpensive procedure under a wide range of conditions, to provide a cleaner environment along with a more stable economy.

Another advantage of the selective HDS is a low level of hydrogen consumption relative to normal HDS or hydrotreating operations. This is a result of the low level of hydrogenation due to low catalytic hydrogenation activity. This not only saves on the cost of hydrogen but also provides improved operation and control of the HDS reaction due to lower reaction heat generation as compared to using a conventional hydrotreating catalyst, which is not selective.

An additional advantage of the selective HDS of the present invention is the ability to operate the HDS process at lower pressures than standard HDS reactions. This provides a significant cost savings.

SUMMARY OF THE INVENTION

This invention relates to a process for selectively hydrodesulfurizing cracked naphtha. The process comprises contacting naphtha, which contains olefins and thiohydrocarbons, with hydrogen under hydroprocessing conditions in the presence of a selectively poisoned or promoted hydrotreating catalyst which selectively produces hydrogen sulfide and desulfurized hydrocarbons while retaining high olefin content.

This invention also relates to a selective hydrodesulfurization catalyst which comprises about 0.1 to about 40 wt. % of a molybdenum and/or tungsten, about 0.1 to about 15 wt. % of nickel and/or cobalt, and about 0.01 to about 20 wt. % of a selective poison selected from the group consisting of Group IA alkali metals, Group IIA alkaline earth metals, Sc, Y, and the Lanthanide elements, each based upon the total catalyst weight, supported on a $MgAl_2O_4$, $ZnAl_2O_4$, $CaAl_2O_4$, $NiAl_2O_4$, $CoAl_2O_4$ or $BaAl_2O_4$ spinel support, preferably with BET surface area greater than about 50 $m^2/g$.

DETAILED DESCRIPTION OF THE INVENTION

This invention enables the selective HDS of cracked naphtha while minimizing loss in octane level. This is achieved using a selectively poisoned hydroprocessing catalyst, which we refer to herein as a selective hydrodesulfurization catalyst.

Hydrodesulfurization (HDS), hydrodenitrogenation (HDN), hydrodeoxygenation (HDO), hydrodemetallation (HDM) and hydrogenation (HYD) take place simultaneously during a normal hydrotreating operation. Conventional alumina supported, sulfided, Co-Mo, Ni-Mo and Ni-W hydrotreating catalysts are highly hydrogenating under the high temperature, high pressure hydrotreating reaction conditions. For most of the reactions taking place during the hydrotreating operation, such hydrogenating ability of the catalyst is very important and is essential. This is the reason why, using a conventional sulfided hydrotreating catalyst, it is not possible to desulfurize cracked naphtha to a significant extent, without also hydrogenating a major fraction of olefins present in it.

We have discovered that high surface area $MgAl_2O_4$, $ZnAl_2O_4$, $CaAl_2O_4$, $NiAl_2O_4$, $CoAl_2O_4$ or $BaAl_2O_4$ spinel supported sulfided Co-Mo catalyst which are selectively poisoned by doping with basic inorganic compounds, for example with alkali or alkaline earth compounds, are highly effective for the selective hydrodesulfurization of cracked naphthas with minimal hydrogenation of olefins. Although not bound to any particular explanation, we believe that the doping of the catalyst with basic compounds selectively poisons the hydrogenation sites on the catalyst surface to a much greater degree than the desulfurization sites. Even though the doped catalysts lose some of their hydrodesulfurization activities relative to the undoped catalysts, for the same product sulfur concentration, the selectivity of the catalysts for preventing olefin saturation improves significantly by doping.

The catalysts of this invention are prepared on $MgAl_2O_4$, $ZnAl_2O_4$, $CaAl_2O_4$, $NiAl_2O_4$, $CoAl_2O_4$ or $BaAl_2O_4$ spinel supports. $MgAl_2O_4$ is preferred. The support can be in the form of powder, granules, pellets, or extrudates. Extrudates are preferred. $MgAl_2O_4$, $ZnAl_2O_4$, $CaAl_2O_4$, $NiAl_2O_4$, $CoAl_2O_4$ or $BaAl_2O_4$ (major component, at least 80% by weight) co-extruded or pelletized with other refractory inorganic oxides or with low or non-acidic clays or graphite/carbon as binders can also be employed as catalyst supports for this invention. The B.E.T. surface area of the support can range from 10 to 500 $m^2/g$, and the pore volume from 0.1 to 1.5 cc/g. Generally, greater surface area and pore volumes are preferable. The spinel supports can contain not more than 5% by weight of non-stoichiometric excess alumina or the corresponding oxides such as MgO, ZnO, CaO, NiO, Co Oxides, and BaO.

The $MgAl_2O_4$ spinel support material can be prepared by any method known in the art. A particularly preferred method for preparing the $MgAl_2O_4$ spinel support for this invention is described in U.S. Patent 4,400,431. Alternatively, the $MgAl_2O_4$ spinel support material can be purchased from TAM Ceramics, of Niagara Falls, N.Y.

The catalysts contain certain Group VIB and Group VIII metals. The Group VIB metals can be Mo and/or W, present in the final catalyst in the amount of about 0.1 to about 40 wt %, preferably in the amount of about 0.1 to about 20 wt. %, based on total catalyst weight. Mo is the preferred Group VIB metal. The Group VIII metals can be nickel and/or cobalt in the amount of about 0.1 to about 15 wt. %, preferably in the amount of about 1 to about 8 wt. %, based on the total catalyst weight. Cobalt is the preferred Group VIII metal. The catalysts can also contain additional promoters such as phosphorus, fluoride, and boron, which are well known additives for hydrotreating catalysts, in amount of 0.01 to 10 wt. %, based on the total catalyst weight. All the wt. % values are values expressed as elemental weight, as a percentage of the total catalyst weight.

The basic compounds, which are the selective poisons for improved selectivity of the catalysts of this invention, can be incorporated into the catalyst through inorganic or organic compounds of Group IA (alkali metals), IIA (alkaline earth metals), Sc, Y, or the Lanthanide elements. For example, such compounds include KCl, $Na_2CO_3$, $NaOC_2H_6$ and potassium naphthenate. Alkali metal compounds are preferred. It is possible to have more than one of these metals in the same catalyst at the same time. The catalysts can contain 0.01 to 20 wt. % of these selective poisons, expressed as elemental weight as a percentage of total catalyst weight. Preferably, the catalysts contain about 0.1 to about 5 wt. % of these selective poisons.

The catalysts for this invention can be prepared using any of the standard methods known to those familiar in the art and the metals (metal compounds) can be deposited on the support in any order, together or individually.

The catalysts can be presulfided either in situ or ex situ prior to their use in the selective hydrodesulfurization process, or they can be used without presulfiding. The sulfiding can be done using any method known in the art such as by heating in a stream of hydrogen sulfide in hydrogen or by flowing an easily decomposable sulfur compound such as carbon disulfide or dimethyl disulfide in a hydrocarbon solvent over the catalyst at elevated temperatures up to about 450° C., at atmospheric or higher pressures, in the presence of hydrogen gas. The sulfiding can also be effected by the sulfur compounds present in the petroleum fraction itself which is being hydrotreated. The catalyst can also be presulfided outside the reactor, suitably passivated and then can be loaded into the reactor. Ex-situ sulfiding can be done using any of the known techniques described in literature. If sufficient amount of sulfur is incorporated into the catalyst using one of these ex-situ presulfiding techniques, activation of the catalyst might be accomplished by heating the catalyst to a suitable temperature in hydrogen flow in the reactor itself.

The catalysts of the present invention are used by passing cracked naphtha through the catalyst bed together with hydrogen gas at pressures ranging from 50–1500 psig, preferably 100–1000 psig and more preferably 100–600 psig, and temperatures ranging from 200°–450° C., preferably 200°–400° C., and more preferably 250°14 350° C., at liquid hourly space velocities (LHSV) ranging from 0.1 to 10 LHSV, preferably 2–8 LHSV and more preferably 3–6 LHSV. Pure hydrogen gas or recycle gas containing largely hydrogen can be used at flow rates ranging from 100–10,000 SCFB, preferably 500–5000 SCFB and more preferably about 2000 SCFB.

The hydrogen used in the selective hydrodesulfurization reaction can be provided as substantially pure hydrogen gas or can contain inert or other gases, including light hydrocarbons. Any hydrogen not consumed during the reaction can be isolated and recycled for reuse. The hydrogen is generally provided as hydrogen-containing gas with a major amount of, over half up to nearly pure, hydrogen gas with the balance being inert or hydrocarbonaceous gases.

The product of the selective HDS, such as illustrated by Equation 1, supra, is desulfurized naphtha retaining high olefins content, and sulfur products consisting essentially of hydrogen sulfide. Generally, the sulfur content of the naphtha is reduced by about 80–90 vol. % or more. The olefin content in the desulfurized naphtha is generally at least about 60 vol. % and typically about 60–80 vol. % or more of the amount present in the naphtha feedstock. The desulfurized naphtha thereby retains a significant octane value as compared with the original octane value of the naphtha.

The hydrogen sulfide or other sulfur products can be removed from the naphtha using any effective, including known, procedure. Typical sulfur removing procedures include, among others: gas sparging, such as with hydrogen or nitrogen; caustic scrubbing; sorption; flashing or the like.

Desulfurized naphtha containing very low sulfur content can be produced. Depending upon the initial sulfur content, feedstock, HDS conditions and other factors influencing sulfur removal, the desulfurized naphtha will generally have less than about 300, preferably less than about 200, and most preferably less than about 100 weight parts per million (ppm) sulfur.

Selective hydrodesulfurization is provided when HDS activity exceeds the activity of other reactions, such as olefin hydrogenation. The extent of HDS selectivity can be determined by any technique for measuring thiohydrocarbon content before and after the HDS reaction as compared with the content of other materials, especially olefins, undergoing hydrotreating reactions, such as hydrogenation. Selective hydrodesulfurization occurs when the degree of HDS, such as measured by the relative proportions of thiohydrocarbons removed by HDS, exceeds the degree of another hydrotreating reaction, like olefin hydrogenation such as measured by the relative proportion of olefins removed by hydrogenation. Significant increases in HDS selectivity are provided by selectively poisoned catalysts as compared with typical hydrotreating catalyst whereby the ratio of thiohydrocarbons removed by HDS, to olefins removed, is up to 2:1 or more using the selectively poisoned catalyst of the present invention.

The naphtha which can be used in this process is essentially any petroleum material containing significant amounts of olefins and thiohydrocarbons. Generally, the naphtha is a mixture of hydrocarbons distilled from crude oil or made directly or indirectly by cracking or other processing. Cracked naphtha is a fraction derived from catalytic or thermal cracking operations of heavier petroleum fractions. Examples of the processes from which cracked naphtha is produced include fluid catalytic cracking, delayed coking, and visbreaking. Olefinic naphtha produced as a byproduct in the manufacture of ethylene by steam cracking process is also included as a feed suitable for the process of this invention. The term hydrocarbon means compounds having hydrogen and carbon atoms. Hydrocarbons can be cyclic or acyclic, including straight- or branched-chain, saturated or unsaturated, including aromatic, and can be unsubstituted or substituted with other elements such as sulfur, oxygen, nitrogen, halogen, as well as metals or others elements found in petroleum. The term thiohydrocarbon means hydrocarbon compounds containing sulfur. The term olefin means non-aromatic, unsaturated hydrocarbons. The naphtha will typically have a boiling range of from about 50° C. to about 200° C., and a maximum boiling point of up to about 230° C.

The sulfur content in the naphtha can be any amount for which sulfur removal is desired. Typically, the naphtha contains from about 0.05 to about 1.0 weight percent sulfur. The sulfur can be present in any, typically hydrocarbonaceous, form. Generally, sulfur is present as a mixture of thiohydrocarbons, including mercaptans, sulfides, disulfides and heterocyclic compounds like thiophenes, such as described in Equation 1 previously.

The olefins contained in the naphtha have one or more ethylenic unsaturation, such as acyclic or cyclic olefins, diolefins and the like. The olefins contribute to the antiknocking property of the composition, as can be shown by the octane number of the composition. Typically, the total amount of olefins is from about 5 to about 60, preferably from about 10 to about 50, and most preferably from about 15 to about 40 volume percent of the naphtha.

The catalysts and the process of this invention are applicable in general to any naphthas with appreciable olefin content, say more than 5% by volume, and boiling below 450° F. Naphthas produced by catalytic or thermal cracking generally fall under this category, but this invention must be applicable for naphthas of any origin, provided they have appreciable olefin content. Olefin rich steam cracking effluents can also be processed using the catalysts of this invention.

The usefulness and effectiveness of the present invention is demonstrated by the following examples.

EXAMPLE 1

Co-Mo-K/MgAl$_2$O$_4$ CATALYST (Catalyst C1)

Step 1: High surface area MgAl$_2$O$_4$ spinel powder was obtained from TAM Ceramics Inc. It is available under the trade name "Cernel 125". The material was mixed thoroughly with deionized water in a muller to a thick paste. It was then extruded as ¹⁄₂₅" extrudates. The extrudates were broken into 3–6 mm length pieces after drying them in air at 125° C. Later they were calcined in air flow at 500° C. for 3 hours. This calcined material was used for catalyst preparation. It had a B.E.T. surface area of 173 m²/g. X-ray diffraction shows no detectable MgO or Al$_2$O$_3$.

Step 2: 1.4 parts of anhydrous K$_2$CO$_3$ was dissolved in 30 parts of deionized water. 40 parts of the above MgAl$_2$Al$_4$ extrudates were impregnated to incipient wetness with this solution. The impregnated material was heated in air at 130° C. for 24 hours.

Step 3: 5.4 parts of ammonium heptamolybdate·4H$_2$O (AHM) was dissolved in 29 parts of deionized water. The dried material from step 2 above was impregnated to incipient wetness with the AHM solution. The impregnated material was heated in air at 125° C. for 24 hours. Later the dried material was calcined in air flow at 500° C. for 3 hours and cooled to room temperature in air flow.

Step 4: The material from step 3 above was impregnated to incipient wetness using a cobalt nitrate solution that was prepared by dissolving 4.5 parts of cobalt nitrate·6H$_2$O in 27 parts of deionized water. The resulting material was heated in air at 125° C. for 24 hours. Later the dried material was calcined in air flow at 500° C. for 3 hours and cooled to room temperature in air flow.

The Mo, K, and Co loadings in the final catalyst are calculated to be nominally 6%, 2% and 2% by weight respectively. We shall refer to this as catalyst C1.

COMPARATIVE EXAMPLE 2

Co-Mo/MgAl$_2$O$_4$ CATALYST (Catalyst C2-COMP)

Step 1: High surface area MgAl$_2$O$_4$ spinel powder was obtained from TAM Ceramics Inc. It is available under the trade name "Cernel 125". The material was mixed thoroughly with deionized water in a muller to a thick paste. It was then extruded as 1/25" extrudates. The extrudates were broken into 3–6 mm length pieces after drying them in air at 125° C. Later they were calcined in air flow at 500° C. for 3 hours. This calcined material was used for catalyst preparation. It had a B.E.T. surface area of 173 m$^2$/g.

Step 2: 5.4 parts of ammonium heptamolybdate·4H$_2$O (AHM) was dissolved in 30 parts of deionized water. 40 parts of the MgAl$_2$O$_4$ extrudates from step 1 above were impregnated to incipient wetness with the AHM solution. The impregnated material was heated in air at 129° C. for 24 hours. Later the dried material was calcined in air flow at 500° C. for 3 hours and cooled to room temperature in air flow.

Step 3: The material from step 2 above was impregnated to incipient wetness using a cobalt nitrate solution that was prepared by dissolving 4.5 parts of cobalt nitrate·6H$_2$O in 28 parts of deionized water. The resulting material was heated in air at 125° C. for 24 hours. Later the dried material was calcined in air flow at 500° C. for 3 hours and cooled to room temperature in air flow.

The Mo and Co loadings in the final catalyst are calculated to be nominally 6% and 2% by weight respectively. We refer to this catalyst herein as C2-COMP.

EXAMPLE 3

Co-Mo-K/MgAl$_2$O$_4$ CATALYST (Catalyst C3)

Step 1: High surface area MgAl$_2$O$_4$ spinel powder was obtained from TAM Ceramics Inc. It is available under the trade name "Cernel 125". The material was mixed thoroughly with deionized water in a muller to a thick paste. It was then extruded as 1/25" extrudates. The extrudates were broken into 3–6 mm length pieces after drying them in air at 125° C. Later they were calcined in air flow at 500° C. for 3 hours. This calcined material was used for catalyst preparation. It had a B.E.T. surface area of 173 m$^2$/g.

Step 2 1.4 parts of anhydrous K$_2$CO$_3$ was dissolved in 30 parts of deionized water. 40 parts of the above MgAl$_2$O$_4$ extrudates were impregnated to incipient wetness with this solution. The impregnated material was heated in air at 130° C. for 24 hours.

Step 3: 5.4 parts of ammonium heptamolybdate·4H$_2$O (AHM) was dissolved in 29 parts of deionized water. The dried material from Step 2 above was impregnated to incipient wetness with the AHM solution. The impregnated material was heated in air at 130° C. for 24 hours.

Step 4: The material from step 3 above was impregnated to incipient wetness using a cobalt nitrate solution that was prepared by dissolving 4.5 parts of cobalt nitrate·6H$_2$O in 28 parts of deionized water. The resulting material was heated in air at 130° C. for 24 hours.

The Mo, K, and Co loadings in the final catalyst are calculated to be nominally 6%, 2% and 2% by weight, respectively. We shall refer to this as catalyst C3.

EXAMPLE 4

Co-Mo-K/MgAl$_2$O$_4$ CATALYST (Catalyst C4)

Step 1: High surface area MgAl$_2$O$_4$ spinel powder was obtained from TAM Ceramics Inc. It is available under the trade name "Cernel 125". 200 parts of this material were mixed thoroughly with a solution made by dissolving 18 parts of ammonium heptamolybdate·4H$_2$O (AHM) and 3.5 parts of anhydrous K$_2$CO$_3$ in deionized water, in a muller, to a thick paste. It was then extruded as 1/25" extrudates. The extrudates were broken into 3–6 mm length pieces after drying them in air at 125° C.

Step 2: 40 parts of the material from step 1 above were impregnated to incipient wetness using a cobalt nitrate solution that was prepared by dissolving 4.5 parts of cobalt nitrate·6H$_2$O in 21.5 parts of deionized water. The resulting material was heated in air at 125° C. for 24 hours.

The Mo, K, and Co loadings in the final catalyst are calculated to be nominally 4%, 1% and 2% by weight, respectively. We shall refer to this as Catalyst C4.

CATALYST EVALUATION

The above catalysts were evaluated for their HDS and olefin hydrogenation (HYD) activities in a conventional hydrotreating reactor system using techniques well known to those familiar with the art. In a typical experiment, 25 cc of the catalyst is loaded into a hydrotreating reactor of 21 mm inner diameter and 50 cm long. It is heated by a four zone furnace, the temperature of each zone being controlled independently. A 6.4 mm O.D. stainless steel thermowell is placed axially throughout the length of the reactor, facilitating precise measurement of the temperature inside the catalyst bed at any point.

All the catalysts were presulfided before contacting the cracked naphtha feed. After purging off of oxygen from the reactor, 200 cc/min of a sulfiding gas consisting of 10% $H_2S$ in hydrogen is passed through the catalyst bed for 15 min at room temperature at 1 atmosphere pressure. With the sulfiding gas flowing, the temperature of the catalyst bed is increased at 1° C./min to 350° C., and kept at the sulfidation temperature of 350° C. for 3 hours. The temperature of the reactor is then lowered to the reaction temperature, with the sulfiding gas still flowing. At this point, a back pressure of about 100 psig is applied to the reactor, and the cracked naphtha flow is started at the desired flow rate. Once the naphtha feed has passed beyond the catalyst bed, the flow of the sulfiding gas is cut off, the flow of pure hydrogen gas is started at the desired rate, and the reactor pressure is increased to 300 psig. The actual hydrotreating reaction is considered to have started at this point of time. The reactor effluent is condensed by passing it through a condenser maintained at about 5° C. in front of a high pressure gas liquid separator.

For each reaction condition, after about 20 hours on stream, which was found be sufficient to attain steady state activities under the reaction conditions employed, 3 liquid product samples were collected for analysis at one hour intervals. One large sample was collected for measuring the octane numbers of the hydrotreated product starting at 5 hours on stream.

The catalysts were evaluated for processing a full range fluid catalytic (FC) cracked naphtha having the properties and composition shown in Table 1. Even though full range FC cracked naphtha was used to show the advantages of this invention, it should be mentioned here that the present invention is applicable for processing other kinds of naphthas such as coker naphthas, in general for naphthas with considerable olefin concentration.

TABLE 1

Properties of Full Range FC Cracked Naphtha

| API Gravity | 56.7° |
|---|---|
| IPB | 91° F. |
| 10% | 131° F. |
| 20% | 145° F. |
| 30% | 161° F. |
| 40% | 183° F. |
| 50% | 210° F. |
| 60% | 242° F. |
| 70% | 275° F. |
| 80% | 309° F. |
| 90% | 346° F. |
| EP | 416° F. |
| S, wt. ppm | 1100 |
| N, wt. ppm | 29 |
| RON | 95.0 |
| MON | 82.0 |
| Olefins (vol. %) | 27.4 |

The sulfur concentrations of the feed and product samples were determined by the X-ray fluorescence (XRF) technique (ASTM D2622). The product samples were carefully sparged ultrasonically at about 5° C. to remove the dissolved $H_2S$ prior to the XRF measurement. The concentration of olefins as volume % in the feed and product samples were measured by PIONA technique. The PIONA technique is widely used in the petroleum industry for this purpose. The octane numbers RON and MON of the feed and product samples were measured by ASTM D2699 and ASTM D2700 methods respectively.

The experimental results of various catalyst evaluations for the hydrodesulfurization of full range fluid catalytic cracked naphtha which led us to the present invention are presented in Table 2. Presented in Table 2 are the catalyst number and description, temperature of the catalyst bed in ° C., % HDS (hydrodesulfurization), % HYD (olefins hydrogenated) during the catalytic process, the ratio of % HDS:% HYD and the change in the average octane number (RON+ MON)/2.

TABLE 2

Results of Catalyst Evaluation

| Catalyst | Catalyst Description | Reaction Temperature °C. | % HDS | % HYD | % HDS:% HYD | Change of Octane Number (RON + MON)/2 |
|---|---|---|---|---|---|---|
| C1 | Co—Mo—K/ MgAl$_2$O$_4$ | 285 | 79.7 | 11.3 | 7.05:1 | −0.9 |
| | | 300 | 91.1 | 33.5 | 2.7:1 | −1.9 |
| | | 315 | 95.4 | 46.6 | 2.04:1 | −2.0 |
| C2-COMP | Co—Mo/ MgAl$_2$O$_4$ | 270 | 85.2 | 42.2 | 2.01:1 | −2.8 |
| | | 285 | 93.1 | 57.9 | 1.6:1 | |
| | | 303 | 97.4 | 78.6 | 1.2:1 | |
| C3 | Co—Mo—K/ MgAl$_2$O$_4$ | 285 | 82.9 | 16.5 | 5.02:1 | |
| | | 300 | 92.4 | 29.2 | 3.16:1 | |
| C4 | Co—Mo—K/ MgAl$_2$O$_4$ | 300 | 93.8 | 50.6 | 1.85:1 | |
| | | 310 | 96.4 | 63.2 | 1.53:1 | |

Notes for Table 2:
a. Feed for the experiments: Full range FC naphtha whose properties are listed in Table 1.
b. Reaction conditions for all the experiments:
Total reaction pressure = 300 psig
Liquid Hourly Space Velocity = 4.0 vol/vol
Hydrogen (100%) flow rate = 2,000 SCFB
c. Catalysts were presulfided at 350° C. in a flow of 10 vol. % $H_2S$ in Hydrogen gas mixture.

The following observations can be made from the results presented in Table 2:

First, the selectively poisoned MgAl$_2$O$_4$ supported catalysts C1, C3 and C4 of the present invention (Co-Mo-K/MgAl$_2$O$_4$) desulfurize full range FC cracked naphtha with significantly higher selectivity (for preventing olefin saturation) compared to the comparative hydroprocessing catalyst which does not contain the selective poison potassium; and second, the selectively poisoned catalysts of the present invention effect much less (RON+MON)/2 octane loss compared to the prior art catalyst (comparative example) that does not contain the selective poison potassium, at similar % HDS levels.

We can conclude from the above observations that the selectively poisoned MgAl$_2$O$_4$ supported Co-Mo catalysts (catalysts doped with basic compounds) are clearly superior to the prior art MgAl$_2$O$_4$ supported catalysts for the selective hydrodesulfurization of cracked naphthas with significantly lower olefin saturation and with significantly lower octane loss in comparison.

We claim:

1. A selective hydrodesulfurization catalyst which comprises about 0.1 to about 40 wt. % of one or more Group VIB metals selected from the group consisting of molybdenum and tungsten, about 0.1 to about 15 wt. % of one or more Group VIII metals selected from the group consisting of nickel and cobalt, and about 0.01 to about 20 wt. % of at least one selective poison selected from the group consisting of Group IA alkali metals, Group IIA alkaline earth metals, Sc, Y, and the Lanthanide elements supported on a spinel support selected from the group consisting of MgAl$_2$O$_4$, ZnAl$_2$O$_4$, CaAl$_2$O$_4$, NiAl$_2$O$_4$, CoAl$_2$O$_4$ or BaAl$_2$O$_4$ spinel supports.

2. The selective hydrodesulfurization catalyst of claim 1 wherein the spinel support is a MgAl$_2$O$_4$ spinel support.

3. The selective hydrodesulfurization catalyst of claim 1 wherein the Group VIII metal is cobalt.

4. The selective hydrodesulfurization catalyst of claim 1 wherein the Group VIB metal is molybdenum.

5. The selective hydrodesulfurization catalyst of claim 1 wherein the selective poison is selected from the group consisting of Group IA alkali metals.

6. The selective hydrodesulfurization catalyst of claim 1 wherein the selective poison comprises potassium.

7. The selective hydrodesulfurization catalyst of claim 1 wherein the selective poison comprises about 0.1 to about 5 wt. % of the catalyst.

8. A selective hydrodesulfurization process which comprises passing naphtha in the presence of hydrogen over a selective hydrodesulfurization catalyst comprising about 0.1 to about 40 wt. % of one or more Group VIB metals selected from the group consisting of molybdenum and tungsten, about 0.1 to about 15 wt. % of one or more Group VIII metals selected from the group consisting of nickel and cobalt and about 0.01 to about 20 wt. % of at least one selective poison selected from the group consisting of Group IA alkali metals, Group IIA alkaline earth metals, Sc, Y, and the Lanthanide elements supported on a spinel support, under process conditions comprising: about 50–1500 psig, about 200°–450° C., and about 0.1 to 10 LHSV and wherein the spinel support is selected from the group consisting of MgAl$_2$O$_4$, ZnAl$_2$O$_4$, CaAl$_2$O$_4$, NiAl$_2$O$_4$, CoAl$_2$O$_4$ or BaAl$_2$O$_4$.

9. The selective hydrodesulfurization process of claim 8 wherein the hydrogen is present in an amount of 100–10,000 SCFB.

10. The selective hydrodesulfurization process of claim 8 wherein the spinel support is a MgAl$_2$O$_4$.

11. The selective hydrodesulfurization process of claim 8 wherein the Group VIB metal comprises molybdenum.

12. The selective hydrodesulfurization process of claim 8 wherein the Group VIII metal is cobalt.

13. The selective hydrodesulfurization catalyst of claim 8 wherein the selective poison is selected from the group consisting of Group IA alkali metals.

14. The selective hydrodesulfurization process of claim 8 wherein the selective poison comprises potassium.

15. The selective hydrodesulfurization process of claim 8 wherein the selective poison comprises about 0.1 to about 5 wt. % of the catalyst.

16. The selective hydrodesulfurization process of claim 8 wherein the process conditions comprise about 100–1000 psig, about 200°–400° C. and about 2–8 LHSV.

17. The selective hydrodesulfurization process of claim 8 wherein the process conditions comprise about 100–1000 psig, about 200°–400° C. and about 2–8 LHSV, and wherein the hydrogen is present in an amount between about 500 and 5000 SCFB.

18. The selective hydrodesulfurization process of claim 8 wherein the process conditions are between about 100–600 psig, about 250°–350° C. and about 3–6 LHSV.

19. The selective hydrodesulfurization process of claim 8 wherein the process conditions are between about 100–600 psig, about 250°–350° C. and about 3–6 LHSV, and wherein the hydrogen is present in an amount of about 2000 SCFB.

20. A selective hydrodesulfurization catalyst which comprises about 0.1 to about 40 wt. % molybdenum, about 0.1 to about 15 wt. % cobalt, and about 0.01 to about 20 wt. % of at least one selective poison selected from the group consisting of Group IA alkali metals supported on a MgAl$_2$O$_4$ spinel support.

21. The selective hydrodesulfurization catalyst of claim 20 wherein the selective hydrodesulfurization catalyst comprises about 0.1 to about 20 wt. % molybdenum, about 1 to about 8 wt. % cobalt, and about 0.1 to about 5 wt. % of at least one selective poison selected from the group consisting of Group IA alkali metals supported on a MgAl$_2$O$_4$ spinel support.

22. The selective hydrodesulfurization catalyst of claim 21 wherein the selective poison is potassium.

* * * * *